No. 735,336. PATENTED AUG. 4, 1903.
J. G. BOWLES.
LOCKING BOLT.
APPLICATION FILED JULY 5, 1902.
NO MODEL.
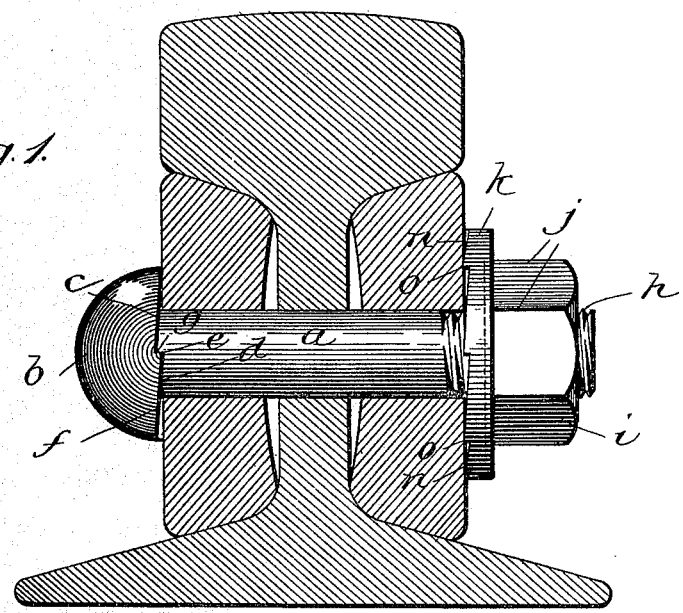
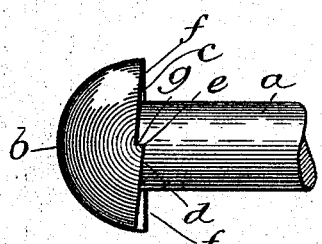
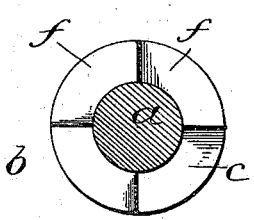
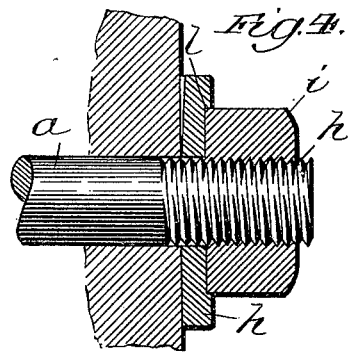
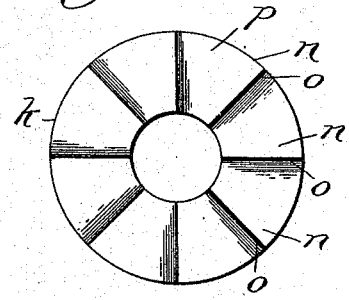
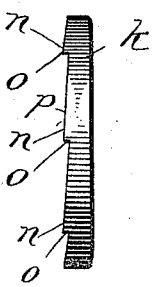
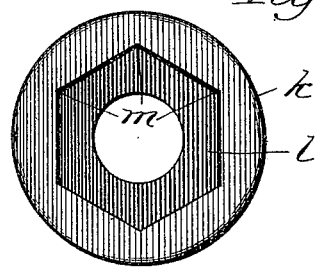
Witnesses:
Inventor:
John G. Bowles,
By Thomas F. Sheridan,
Atty.

No. 735,336. Patented August 4, 1903.

UNITED STATES PATENT OFFICE.

JOHN G. BOWLES, OF CHICAGO, ILLINOIS.

LOCKING-BOLT.

SPECIFICATION forming part of Letters Patent No. 735,336, dated August 4, 1903.

Application filed July 5, 1902. Serial No. 114,418. (No model.)

*To all whom it may concern:*

Be it known that I, JOHN G. BOWLES, a citizen of the United States, residing at Chicago, in the county of Cook and State of Illinois, have invented certain new and useful Improvements in Locking-Bolts, of which the following is a specification.

My invention relates to that class of locking-bolts which are provided at one end with means for preventing the bolt from turning in a direction which would unscrew the nut and at the opposite end with means for preventing the nut from turning, whereby both the bolt and nut mechanism are held in position and prevented from turning in opposite directions.

The principal object of the invention is to provide a bolt having a head provided with means for preventing the bolt from turning in a direction which would unscrew or loosen the nut thereon and in combination therewith means for preventing the nut from turning in a direction which would loosen it upon the bolt, whereby both the nut mechanism and bolt are held firmly in position and prevented from turning in a direction which would loosen or unscrew either.

The invention consists in the features, combinations, and details of construction hereinafter described and claimed.

In the accompanying drawings, Figure 1 is a side view of a locking-bolt constructed in accordance with my improvements, showing it applied to a railroad-rail and fish-plate; Fig. 2, a side view of the headed end of the bolt; Fig. 3, a cross-sectional view of the bolt, showing the inner face of the toothed bolt-head; Fig. 4, a side view of the threaded end of the bolt, showing the locking-washer and nut in longitudinal section; Fig. 5, a face view of the locking-washer, showing the toothed face; Fig. 6, a side view of the locking-washer; and Fig. 7, a face view of the locking-washer, showing the angular pocket for receiving the end of the nut.

It is desirable that a locking-bolt and nut mechanism be provided adapted to hold a pair of railroad fish-plates, and thereby the rails, firmly in position and provided with means for preventing both the bolt and its nut from turning or becoming loosened by the vibrations to which such rails and rail connections are subjected and which may be used, if desired, in connection with other devices which are subject to severe strains or vibrations tending to loosen the connecting bolts and nuts. In order to accomplish these purposes, I provide a locking-bolt $a$, having a preferably integral head portion $b$, the inner face $c$ of which is provided with a plurality of ratchet-teeth $d$, each having an inner edge $e$ extending at a right angle with the longitudinal axis of the bolt from the periphery of the body of the bolt to the outer edge of the bolt-head, one side of each of such teeth having an inclined surface $f$ and the other side $g$ being parallel with the longitudinal axis of the bolt, such teeth having their edges at equal distances apart. An abrupt shoulder is thus formed on one side of each tooth, which prevents the bolt from turning in that direction and forms on the opposite or "face" side of each tooth a gradually-receding face, which forms when the edge becomes seated a firm and broad base for supporting the strain to which the bolt-head is subjected. The opposite end of the bolt is provided with screw-threads $h$, and a threaded nut $i$, having shoulders $j$, is mounted thereon and in threaded connection with such bolt. A rigid locking-washer $k$ is then provided, having on one side a concave pocket $l$, having angles $m$, adapted to admit the shoulders of the nut and hold such nut and the locking-washer in fixed relation to each other, the inner end of the nut being set in such pocket when the parts are in operative position. By this arrangement the nut when turned in the desired direction will cause the locking-washer to turn therewith, and the washer when thus screwed tightly into position against a fish-plate or similar object will prevent the nut from turning independently of the washer.

In order to prevent the locking-washer from turning in a direction which would permit the nut to become unscrewed, such locking-washer is provided on its inner face with ratchet-teeth $n$, similar to those upon the inner face of the bolt-head, having their edges at equal distances apart on the washer-face. One side of each tooth is parallel with the longitudinal axis of the bolt and forms a shoulder $o$, and each of such teeth has a broad face $p$ extending from the edge or shoulder of such tooth at a receding angle to the shoulder of the next adjacent tooth, forming a broad seat or base and long edges or shoulders which by reason of their great length and broad base become seated firmly in the material to which they are attached before being worn away.

The surfaces of the inclined faces of the ratchet-teeth of both the bolt-head and the locking-washer extend in an opposite direction or pitch to the spiral pitch of the threads of the bolt. It will therefore be readily apparent that by this arrangement when the parts are in operative position the ratchet-teeth of the bolt-head prevent the bolt from turning in the direction which would unscrew the nut or cause it to become loosened and that the ratchet-teeth upon the locking-washer, in connection with the angular slot in its opposite side, prevent both the washer and nut from turning in the direction which would cause the parts to unscrew or become loosened. It will also be readily apparent that in order to accomplish the purposes of the invention it is essential that both the bolt and the locking-washer and nut mechanism be prevented from turning and that this object is accomplished by the means herein described.

I claim—

1. In a locking-bolt, the combination of a body portion provided with a screw-threaded nut and head portion, a plurality of ratchet-teeth on the inner face of the head portion, a polygonal nut in threaded connection with the threaded end of the bolt, and a locking-washer rotatably and slidably mounted upon the bolt between the nut and head portion having ratchet-teeth on its inner face and a pocket or recess on its outer face adapted to fit and receive the inner end of the nut and hold it in fixed relation, substantially as described.

2. In a locking-bolt of the class described, the combination of a body portion provided with a threaded nut and a head portion having a convex outer surface and a plurality of ratchet-teeth on its inner face, a hexagonal nut in threaded connection with the threaded end of the bolt, and a locking-washer rotatably and slidably mounted upon the bolt between the head and nut having a plurality of ratchet-teeth on its inner face and a hexagonal recess on its outer face to fit and receive the end of the nut and hold it in fixed relation, substantially as described.

JOHN G. BOWLES.

Witnesses:
HARRY I. CROMER,
J. E. RUPP.